(12) United States Patent
Cui et al.

(10) Patent No.: US 11,909,642 B2
(45) Date of Patent: Feb. 20, 2024

(54) OFFLOAD OF ACKNOWLEDGEMENTS TO A NETWORK DEVICE

(71) Applicant: Intel Corporation, Santa Clara, CA (US)

(72) Inventors: Bo Cui, Shanghai (CN); Stephen Doyle, Ennis (IE)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 17/011,964

(22) Filed: Sep. 3, 2020

(65) Prior Publication Data

US 2020/0403919 A1 Dec. 24, 2020

(51) Int. Cl.
*H04L 47/12* (2022.01)
*H04L 9/40* (2022.01)
*H04L 69/22* (2022.01)
*H04L 1/1812* (2023.01)

(52) U.S. Cl.
CPC .......... *H04L 47/12* (2013.01); *H04L 1/1812* (2013.01); *H04L 63/0428* (2013.01); *H04L 69/22* (2013.01)

(58) Field of Classification Search
CPC ....... H04L 47/10; H04L 47/12; H04L 47/129; H04L 63/04; H04L 63/0428; H04L 69/00; H04L 69/22; H04L 1/18; H04L 1/1812; H04L 5/21; H04L 1/00; H04L 1/0072; H04L 1/0073; H04L 1/1621; H04L 1/1628; H04L 1/1635; H04L 1/1829;
(Continued)

(56) References Cited

U.S. PATENT DOCUMENTS 6,993,644 B2 * 1/2006 Anand ................. G06F 9/5027
709/219
7,546,369 B2 * 6/2009 Berg ........................ H04L 9/40
709/227
(Continued)

OTHER PUBLICATIONS

Iyengar, Jana and Thomson, Martin, "QUIC: A UDP-Based Multiplexed and Secure Transport", https://datatracker.ietf.org/doc/html/draft-ietf-quic-transport-29, Published Jun. 10, 2020, 164 pages.
(Continued)

*Primary Examiner* — Warner Wong
(74) *Attorney, Agent, or Firm* — Compass IP Law PC

(57) ABSTRACT

Examples described herein relate to a network device apparatus that includes a network interface card to process a received packet. In some examples, based on the received packet only including one or more frames for which acknowledgement of receipt is offloaded to the network interface card, generate an acknowledgement (ACK) message to acknowledge receipt of the received packet. In some examples, a frame for which acknowledgement of receipt is offloaded to the network interface card comprises a STREAM frame compatible with quick User Datagram Protocol (UDP) Internet Connections (QUIC). In some examples, a computing platform is coupled to the network interface card. In some examples, based on the received packet only including any frame for which acknowledgement of receipt is not offloaded to the network interface, the computing platform is to generate an ACK message for the received packet.

24 Claims, 8 Drawing Sheets

(58) Field of Classification Search
CPC ..... H04L 1/1864; H04L 1/1868; H04L 47/00; H04L 49/9068
See application file for complete search history.

(56) References Cited

U.S. PATENT DOCUMENTS

| | | | | |
|---|---|---|---|---|
| 7,672,239 | B1* | 3/2010 | Tripathi | H04L 69/16 370/235 |
| 7,912,060 | B1* | 3/2011 | Chen | H04L 47/27 370/231 |
| 8,174,975 | B2 | 5/2012 | Lindsay | |
| 2002/0095519 | A1* | 7/2002 | Philbrick | H04L 67/62 709/250 |
| 2004/0258075 | A1* | 12/2004 | Sidenblad | H04L 69/161 370/395.5 |
| 2005/0131986 | A1* | 6/2005 | Haagens | H04L 47/10 709/201 |
| 2007/0101023 | A1* | 5/2007 | Chhabra | H04L 69/12 709/246 |
| 2008/0127227 | A1* | 5/2008 | Aloni | G06F 9/4555 719/321 |
| 2008/0304481 | A1* | 12/2008 | Gurney | H04L 69/16 370/389 |
| 2019/0058780 | A1* | 2/2019 | Gil | G06F 13/128 |
| 2019/0229903 | A1* | 7/2019 | Balasubramanian | H04L 63/166 |
| 2022/0124039 | A1* | 4/2022 | Chandra | H04L 47/22 |

OTHER PUBLICATIONS

Mathis, Matt et al., RFC: 2018, "TCP Selective Acknowledgment Options", https://datatracker.ietf.org/doc/html/rfc2018, Oct. 1996, 12 pages.

Boutier, Matthieu, et al., "User-space Multipath UDP in Mosh", Sorbonne Paris Cite, PPS, UMR 7126, CNRS, F-75205 Paris, France, Feb. 2015, 8 pages.

Gratzer, Florian, "QUIC—Quick UDP Internet Connections", Seminars FI/IITM SS 16, Network Architectures and Services, Sep. 2016, 8 pages.

Yengar, J., et al., "QUIC Loss Detection and Congestion Control draft-ietf-quic-recovery-14", QUIC Working Group, https://greenbytes.de/tech/webdav/draft-ietf-quic-recovery-14.xml, Aug. 15, 2018, 37 pages.

Yengar, J., et al., "QUIC: A UDP-Based Multiplexed and Secure Transport draft-ietf-quic-transport-19", QUIC Transport Protocol, https://datatracker.ietf.org/doc/html/draft-ietf-quic-transport-19, Mar. 11, 2019, 139 pages.

Senapathi, Sandhya, et al., "Introduction to TCP Offload Engines", Network and Communications, www.dell.com/powersolutions, Mar. 2004, 5 pages.

* cited by examiner

OFFLOAD OF ACKNOWLEDGEMENTS TO A NETWORK DEVICE

Traditionally, networked host computers have handled communication tasks at the network and transport layers and some tasks at the link layer using host software, while leaving the remaining link and physical layer communication tasks to an attached network adapter. Thus for a multitudes of packet transmitted or received by the network adapter, the host processor expends resources in handling packetization, header manipulation, receipt acknowledgment, and error control. At higher transmit and receive rates, server systems will often have a maximum network transmission rate limited by the ability of the host processor to handle its network and transport layer tasks, rather than by the speed of the physical connection or the network adapter. Consequently, host-implemented networking tasks can reduce bandwidth utilization and occupy processor throughput that could otherwise be devoted to running applications.

DETAILED DESCRIPTION

User-space Transmission Control Protocol (TCP) stacks (e.g., mTCP, fstack, ANS, TLDK, VPP and so forth) are available to provide transport layer protocol processing. Internet Engineering Task Force (IETF) quick User Datagram Protocol (UDP) Internet Connections (QUIC) Transport Specification is an evolving transport layer standard based on UDP. Some QUIC implementations take the advantage of user space implementation which makes the stack easy to update, debug and profile, and the usage of a UDP socket in those QUIC servers/clients are similar. In the stack, the network instance selects available socket file descriptors (FDs), reads data from a socket buffer or writes to the socket buffer if any outstanding data is ready for transmission.

However, for some implementations of QUIC, a receiver platform spends processor cycles handling generation of acknowledgement (ACK) messages. In some cases, generation of ACK messages by processors (e.g., central processing units (CPUs)) can take even more processor cycles than processing of received packet content. For example, uses of HTTP_QUIC in user space can incur significant processing costs related to acknowledgement generation for one-way traffic (e.g., upstream or downstream traffic). Some examples of one-way traffic can include file download or chunk data backup or online video/audio. In addition, ACK generation can be handled in user space, which involves traversing a software stack including a kernel space to user space boundary.

Figure 1:
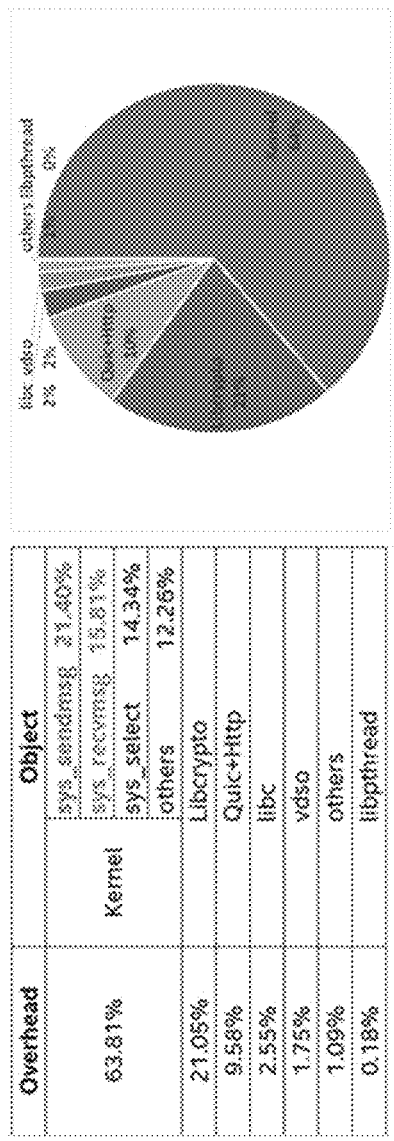
FIG. 1 shows an example of receiver core utilization.

For example, for a HTTP-GET operation, transmission of QUIC Acknowledgements spends approximately 20% of CPU resources to generate an ACK to confirm arrived transport layer Packet Number. FIG. 1 shows an example where a receiver core spends approximately 15.8% of CPU resources process 1.03 Gb/s payload while 21.4% of CPU resources is consumed to send only 33 Mb/s ACK messages. As shown, generation of ACKs can trigger considerable user-kernel system calls to transfer smaller sized packets (e.g., 37 Bytes), thereby achieving a very low throughput.

Some solutions delay generation of ACK messages whereby multiple QUIC ACK responses may be combined together into one single response which can reduce protocol processing overhead. For example, transport parameter max_ack_delay can be applied to ensure an ACK is sent at least once per round-trip time (RTT). Acknowledgement message sending frequency can be reduced while allowing for near real-time congestion management. However, the additional wait time introduced by the delayed ACK can cause further delays in some cases. The reduced feedback from the receiver can wane loss and congestion response of sender.

A user-space UDP protocol can be used to bypass the kernel stack and replace the network stack with a parallel and performant user space implementation. Traffic congestion control, handshake and order can be handled by QUIC protocol layer. However, parallel user-space networking stacks may have security, manageability, robustness, and protocol compatibility issues.

Various embodiments offload acknowledgement of receipt at least of QUIC packets to a network interface at least for packets that include solely STREAM frames or content for which receipt can be acknowledged prior to application processing of the frames or content, to reduce overall CPU usage and improve the power efficiency of network applications. Various embodiments can be used with any transport layer protocol and encryption/decryption scheme, including but not limited to remote direct memory access (RDMA), Transmission Control Protocol (TCP), Multipath TCP (MPTCP), InfiniBand, FibreChannel, User Datagram Protocol (UDP), Google QUIC (gQUIC), Transport Layer Security (TLS), IP security (IPSec), and variations thereof. For example, TCP and TLS and HTTP/2 implemented on UDP can be used. Various embodiments can be implemented using user space software stacks.

Figure 2:
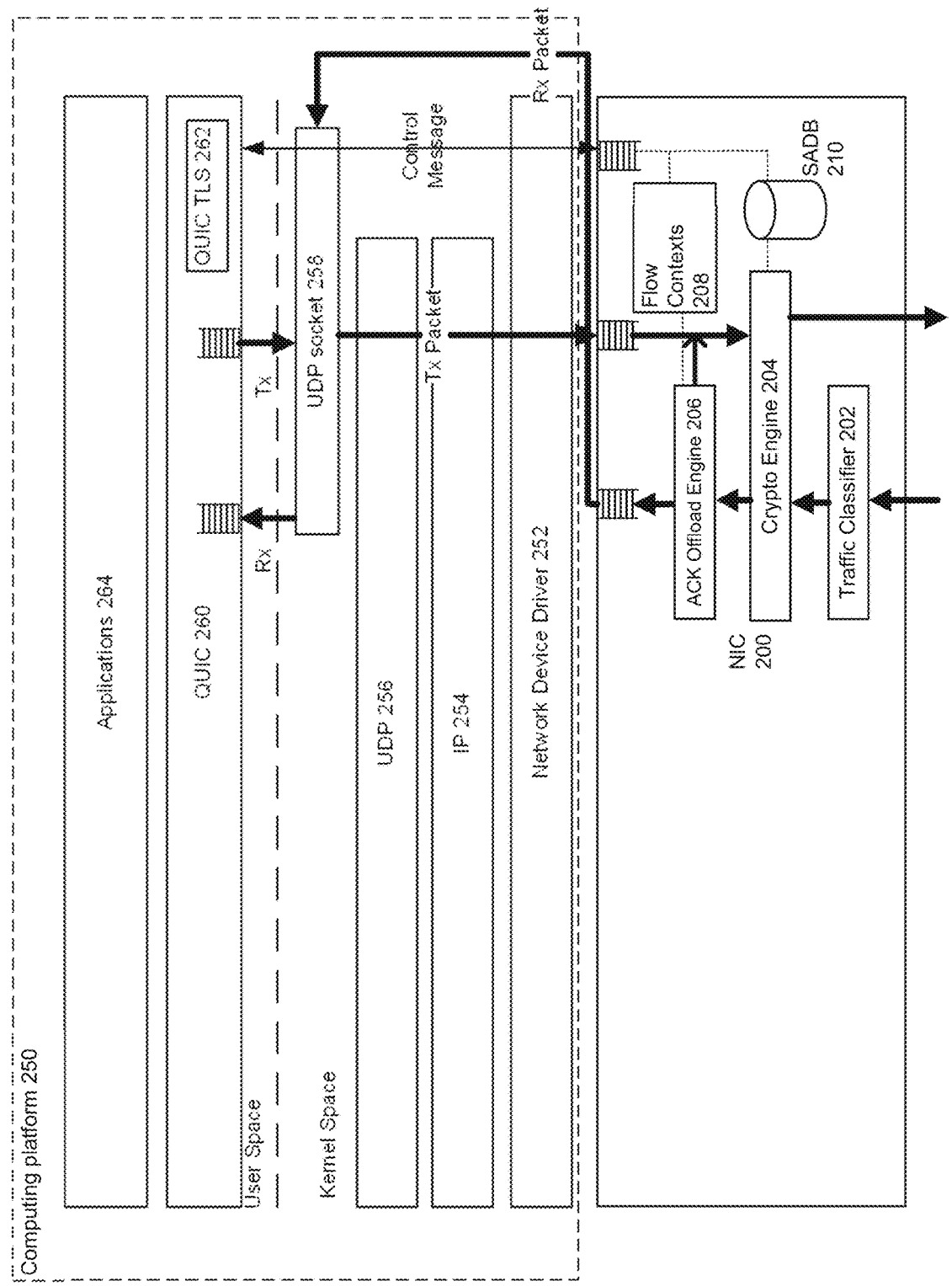
FIG. 2 depicts an example of an ACK Offload Engine (AOE) in a network device.

FIG. 2 depicts an example of an ACK Offload Engine (AOE) in a network device that works together with a cryptographic accelerator to generate and transmit acknowledgements. Various embodiments provide a network interface card that performs the packet-based crypto offload and real-time acknowledgement for STREAM frames whose packet protections have been authenticated and removed. Description first turns to processing of packets using network interface card (NIC) 200 and then turns to initialization of NIC 200 to handle ACK generation for packets that only include content for which receipt can be acknowledged prior to application processing of the content.

In some examples, ingress QUIC packets are processed as follows. A received packet at NIC 200 is processed by traffic classifier 202 to classify QUIC packets as associated with a QUIC connection context. A QUIC connection context can be tracked by flow contexts 208. For example, flow contexts 208 can include crypto information (e.g., algorithm to apply for decryption or encryption and a corresponding key to use during a crypto operation). Flow contexts 208 can include connection status. Crypto engine 204 can use crypto information in flow contexts 208 to authenticate and remove QUIC crypto-based packet protection and provide clear text frame content. If decryption of the received packet fails, a notification can be sent to network device driver 252 to indicate that offload has failed and QUIC layer 260 can perform processing of the packet to attempt decryption. Such a case may arise if cryptographic keys have been changed and the updated key has not been propagated to crypto engine 204. If decryption succeeds, QUIC connection context in flow contexts 208 can be updated with a (PN) from a header of a received packet.

In some examples, crypto engine 204 can be a separate device from a device that performs IPSec and TLS. In some examples, crypto engine 204 can also perform offloaded IPSec decryption/encryption, offloaded TLS decryption or encryption, or offloaded kernel TLS (kTLS) decryption/encryption (e.g., tls-hw-tx-offload and tls-hw-rx-offload). kTLS is a Linux kernel implementation of a TLS data path whereby encryption and decryption steps are moved into the kernel and inline with the flow of traffic into and out of a computer or server.

ACK offload engine 206 can determine if the received packet includes only STREAM frames or content for which acknowledgement of receipt is permitted to be made before access or processing of the content by an application. According to Internet Engineering Task Force (IETF) draft standard "QUIC: A UDP-Based Multiplexed and Secure Transport," draft-ietf-quic-transport-29 (2020), STREAM frames are general application payloads that can be acknowledged even if not delivered and processed, accessed, or consumed by any application. STREAM frames are described for example in section 19.8 of draft-ietf-quic-transport-latest (2020), and variations thereof. A STREAM frame can carry stream data. Stream multiplexing can be achieved by interleaving STREAM frames from multiple streams into one or more QUIC packets. A single QUIC packet may bundle STREAM frames from multiple streams. A STREAM frame can include a value in its header that identifies that frame is a STREAM frame. For example, a value of frame type between 0x08-0x0f identifies a frame as a STREAM frame.

For example, a receiver (e.g., ACK offload engine 206) can parse deciphered packet and iterate on all frames to detect that a packet includes only STREAM frames. For example, non-STREAM frames can include control messages, received ACKs, frames whose receipt cannot be acknowledged before processing, consumption, or access by an application, as well as PING frames (e.g., used to check reachability to the peers) or RESET_STREAM frame (e.g., used to abruptly terminate the sending part of a stream).

If the received packet includes only STREAM frames, NIC 200 can copy any STREAM frame from the received packet to a buffer for processing by a software stack and include an indication in a descriptor that the ACK operation was performed for the received packet. NIC 200 can provide the decrypted packet content to a buffer managed by a network device driver 252 and provide a completed descriptor with an indication of buffer in which the decrypted packet is stored with an ACK Offload (AKO) flag indicating ACK operation has been performed. In addition, ACK offload engine 206 can construct an ACK message or packet according to information inside the context (e.g., Ethernet header, IP source and destination addresses, and UDP port identifiers), crypto engine 204 can encrypt the ACK message or packet, and the encrypted ACK message or packet can be inserted into a specified Tx queue of an egress port for transmission to a sender of the packet (e.g., a peer). Accordingly, various embodiments can free up processor resources for other uses in a server or computing platform that would otherwise be used to generate ACK messages or packets. In some examples, ACK messages or packets can be generated more rapidly by use of NIC 200 than use of processors of computing platform 250.

Applications 264 can process decrypted packet. For example, any type of application can be used such as video streaming application, database, webserver, web browser, and so forth. Applications 264 can utilize HTTP/3 or Domain Name System (DNS) for network or fabric communication.

If any non-STREAM frame is present in the received packet, NIC 200 can copy any STREAM frame and non-STREAM frame from the received packet to a buffer for processing by a software stack. Network device driver 252 can manage contents of the buffer and the received packet in the buffer can be processed through the kernel stack and be presented to user space QUIC layer 262 via socket 258. NIC 200 can also include an indication in a descriptor that the ACK operation was not performed for the received packet. The software stack can handle generation of ACK messages or packets for any received packet that includes a non-STREAM frame or frame whose receipt cannot be acknowledged before processing by an application. NIC 200 can transmit the ACK message or packet generated by the software stack.

In some examples, NIC 200 includes a network interface, network interface controller or a network interface card. In some examples, a network interface can be part of a switch or a system-on-chip (SoC) with devices such as a processor or memory.

Computing platform 250 can include one or more central processing units (CPUs), cores, graphics processing units (GPUs), accelerators, memory, storage, and interface devices (e.g., fabric interface, bus interface, or interconnect interface). Computing platform 250 can execute various software layers in connection with managing packet transmission and receipt. An operating system (not shown) can be executed, such as but not limited to, VMWare®, Linux®, Windows® Server, FreeBSD, Android®, MacOS®, iOS®, or any other operating system. Computing platform 250 can execute any software in a virtual machine or container environment.

For example, an operating system can determine a capability of a device associated with device driver 252. For example, the operating system can receive an indication of capability of a device (e.g., NIC 200) to perform one or more of: decryption of a received packet, generation of ACKs for packets that only include STREAM frames, generation of a NACK, or selective ACK (SACK) (RFC 2018). For a SACK, a receiver (e.g., NIC 200) can inform a sender of segments that have arrived successfully, so the sender can re-transmit only the segments that have not arrived at the receiver. The operating system can request driver 252 to enable or disable NIC 200 to perform one or more of: decryption of a received packet, generation of ACKs for packets that only include STREAM frames, generation of NACK, or SACK. In some examples, the operating system, itself, can enable or disable NIC 200 to perform one or more of: decryption of a received packet, generation of ACKs for packets that only include STREAM frames, generation of NACK, or SACK. The operating system can provide requests (e.g., from an application, virtual machine, or container) to NIC 200 to utilize one or more features of NIC 200, such as any of: decryption of a received packet, generation of ACKs for packets that only include STREAM frames, generation of NACK, or SACK.

For example, any of applications 264 can request use or non-use of cryptographic offload or ACK offload performance to NIC 200. A datasheet for NIC 200, program guide, or device driver source code for NIC 200 can access cryptographic offload or ACK offload performance using hardware registers or software configuration flows and sample codes.

IP layer 254 can verify a destination IP header of a received packet to ensure that the destination IP header is consistent with the IP address of a local QUIC instance. IP layer 254 can encapsulate an egress packet with an IP header and deliver the datagram to NIC 200. IP layer 254 can execute in kernel space.

UDP layer 256 can perform integrity check (e.g., verify checksum) of an ingress packet and assign the ingress packet into a QUIC connection based on UDP port number. For data to be transmitted, UDP layer 256 can encapsulate the data with a UDP header and deliver a packet into IP layer 254. UDP layer 256 can execute in kernel space.

UDP socket layer 258 can be used to transfer QUIC payload and control messages are transferred over UDP socket. From implementation of view, this socket can be broken down into multiple sockets, so QUIC data path and control path can be processed respectively. UDP socket layer 258 can execute in kernel space and provide a gateway to user space layers or software executing in user space. Kernel space can be a memory area reserved for use by a privileged operating system kernel, kernel extensions, some device drivers, and other software and can provide for secure operations. By contrast, user space or userspace can be a memory area where application software and some drivers execute and write or read content.

QUIC layer 260 can be used to perform user space QUIC stack processing including, at least, transport layer functionalities defined by any QUIC specification. QUIC layer 260 can execute in user space. QUIC TLS layer 262 can implement key exchange during a connection initialization phase of QUIC. The negotiated keys can be provisioned into NIC 200 for use by crypto engine 204 after a handshake is accomplished.

Figure 3:
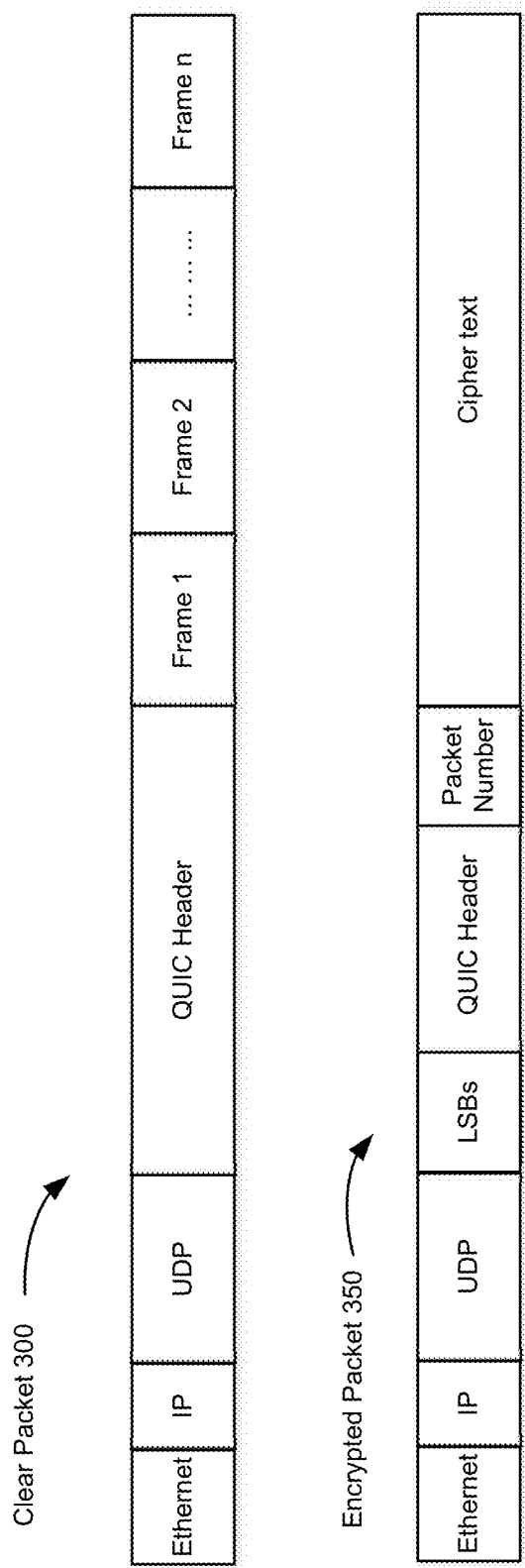
FIG. 3 shows an example of a packet and encrypted packet.

FIG. 3 shows an example of a packet prior to encryption and a packet that is encrypted. However, examples described herein can apply to any type of packet. After a QUIC connection is up, the data path STREAM frames within the connection are transferred with short headers. A packet with a short header does not include a length field to indicate a length of the packet. A STREAM frame can be a last packet in a UDP datagram. A network device can encrypt partial header fields and frames for egress, and vice versa for ingress. For example, as shown, clear packet 300 can include various header fields (e.g., Ethernet, IP, UDP, and QUIC) and frames 1 to n. Encrypted packet 350 can include headers with least significant bits (LSBs) and packet number added as well as cipher text. Cipher text can include an encrypted version of frames 1 to n. Cipher text can include 16 bytes authentication tag for, e.g., AEAD_AES_128_GCM encryption scheme, although other encryption schemes can be used.

Figure 4:
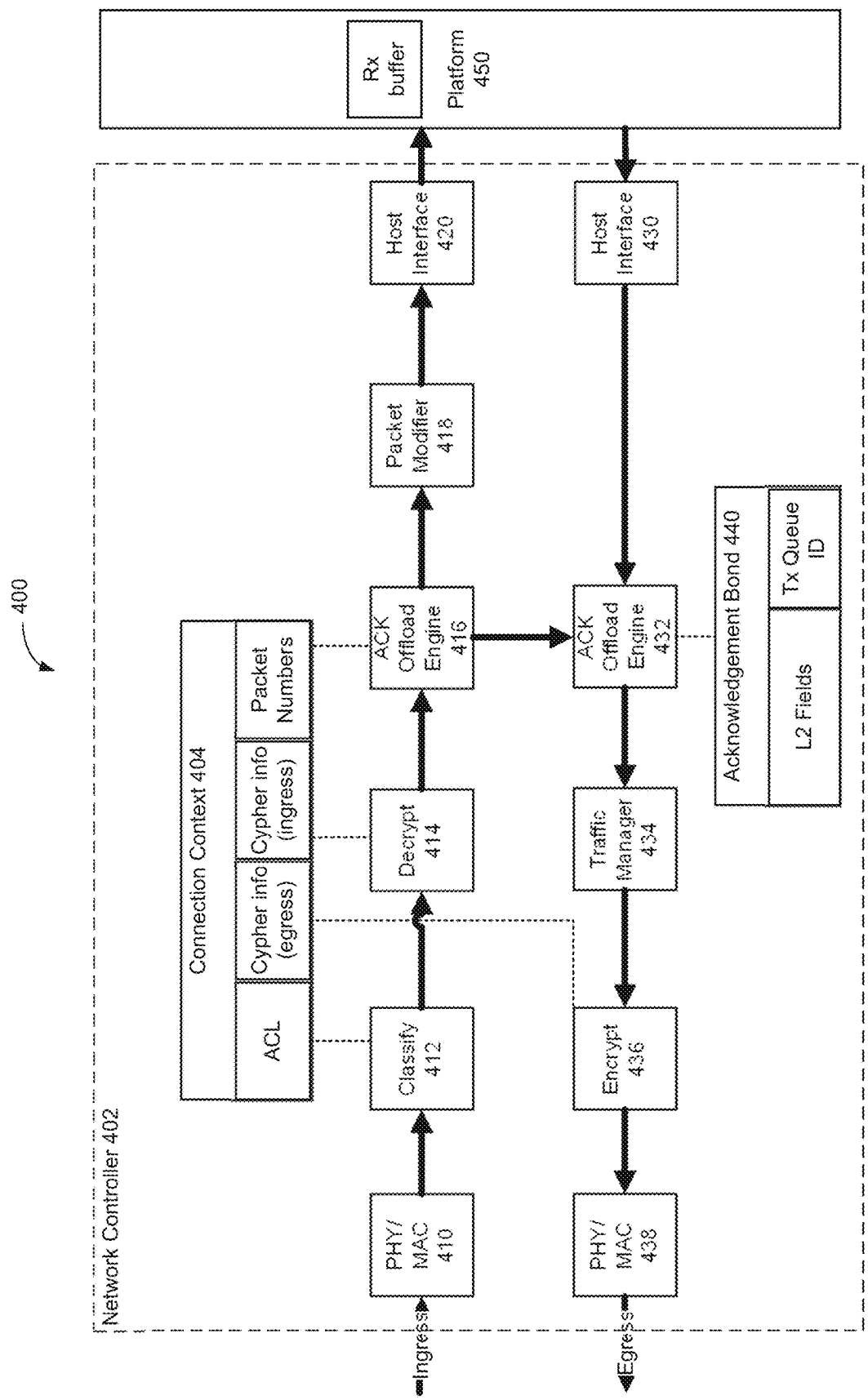
FIG. 4 shows an example overview of a packet processing pipeline.

FIG. 4 shows an example overview of a packet processing pipeline. In system 400, network controller 402 (e.g., network interface card, network interface controller, or network interface) can be configured to perform ACK operations in response to packets received over at least a QUIC connection where the packets include STREAM frames and no non-STREAM frame. After a QUIC handshake is performed with a remote network interface card or platform, connection context 404 is constructed to maintain the ingress and egress connection contexts. An ingress context can include information such as that in the following table.

| Context information | Example |
|---|---|
| Access control list (ACL) | ACL can include a source or destination IP address, UDP ports, Connection ID, or other packet characteristics used to filter packets (e.g., flow identifiers). ACL can be used to classify the ingress QUIC traffic and specify whether a packet is to be dropped or permitted to be processed by network controller 402 or platform 450. |
| Cipher information | Cipher information can include a cryptography algorithm or identification of algorithm, keys, and initialization vector (IV). Ingress cryptography information can be used to authenticate and decipher ingress packets. Egress cryptography information can also be included and used to generate egress ACKs at network controller 402. |
| Packet Number | Status of received Packet Number. Context can be updated to include received packet numbers. |

Context information in connection context 404 can be provisioned into network controller 402 by a QUIC software stack or other protocol software stack (e.g., driver or operating system) executing on platform 450. In some examples, connection context 404 can be provisioned into network controller 402 after connection setup.

Classifier 412 can perform filtering of received packets based on applicable ACL rules in connection context 404 such as a flow. A packet may be used herein to refer to various formatted collections of bits that may be sent across a network, such as Ethernet frames, IP packets, TCP segments, UDP datagrams, etc. References to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model. Physical layer interface (PHY) and media access controller (MAC) 410 can receive ingress packets and decode data packets according to applicable physical layer specifications or standards and perform MAC address filtering on received packets, disassemble data from received packets, and perform error detection. A flow can be a sequence of packets being transferred between two endpoints, generally representing a single session using a known protocol. Accordingly, a flow can be identified by a set of defined N tuples and, for routing purpose, a flow can be identified by tuples that identify the endpoints, e.g., the source and destination addresses. For content based services (e.g., load balancer, firewall, intrusion detection system etc.), flows can be identified at a finer granularity by using five or more tuples (e.g., source address, destination address, IP protocol, transport layer source port, and destination port). A packet in a flow is expected to have the same set of tuples in the packet header. Decrypt 414 can perform decryption of contents of packets based on ingress cipher information in connection context 404.

Packet Number can be a dynamic status of received packets tracked and updated by ACK Offload Engine 416 based on packet numbers of incoming or ingress packet traffic. An interface (e.g., register) can be used to synchronize the received Packet Number between a software stack executed on platform 450 and network controller 402. If a received packet has a Packet Number that was previously received, the received packet with a duplicate Packet Number can be dropped.

After a packet with a new Packet Number is received at network controller 402, ACK Offload Engine 416 receives indication of a receipt of a new Packet Number. ACK Offload Engine 416 can determine if received packets include any STREAM frame and no non-STREAM frame or only content that can be acknowledged even if not delivered and processed, accessed, or consumed by any application. Based on a received packet with a new Packet Number being received and the packet includes any STREAM frame and no non-STREAM frame or only content that can be acknowledged even if not delivered and processed, accessed, or consumed by any application, ACK Offload Engine 416 can generate a clear text ACK packet (e.g., QUIC ACK packet) based on a current Packet Number status and the Layer 2 information in connection context 404. An ACK packet can include at least a source and destination address, indicator field that the packet is an acknowledgment, and packet number(s) of received packets for which acknowledgement of received is being made. In some examples, an ACK frame format can be defined at least in Section 19.3 of draft-ietf-quic-transport-29 (2020) (or variations thereof), although ACK frame formats of any transport layer can be used.

The decrypted packet can be sent to a host receive (Rx) queue accessible to platform 450 with an ACK Offload (AKO) flag inside an Rx packet descriptor (not shown). The descriptor can include at least an identification of a memory buffer (e.g., Rx buffer) in which a received packet is stored. The AKO flag can indicate that network controller 402 has generated an ACK so that software executing on platform 450 does not need to duplicate ACK generation and generate another ACK for a received packet.

Packet modifier 418 can modify packets based on configurations. For example, packet forwarding operations can be used to update a packet header to indicate a next destination.

Host interfaces 420 and 430 can provide connectivity between network controller 402 and platform 450. For example, host interfaces 420 and 430 can perform direct memory access (DMA) operations to copy data, descriptors, context, or other metadata from network controller 402 to platform 450 or vice versa. For example, host interfaces 420 and 430 can be compatible with any standard such as PCIe, CXL, and any other specifications.

For offload of ACK packet generation and transmission to network controller 402, platform 450 (e.g., software stack, driver or operating system) can provision ACK bond 440 for generation of egress ACK packets by network controller 402. Information in ACK bond 440 can include metadata used for ACK offload engine 432 to construct an ACK packet to a sender of a received packet or intermediary instead of platform 450 generating the ACK packet. For example, ACK offload engine 416 can generate a clear text ACK packet (e.g., unencrypted ACK packet) or request ACK offload engine 432 to generate a clear text ACK packet. Metadata can include Ethernet layer 2 information such as destination MAC address, source MAC address, virtual local area network (VLAN) or priority and an Ethernet transmit (Tx) queue ID for use to store an ACK packet generated by network controller 402. ACK offload engine 432 can insert the ACK packet into the specified Tx queue to be scheduled for transmission by network controller 402.

In some examples, ACK Offload Engine 432 can coalesce multiple ACKs for multiple Packet Numbers into a single ACK packet to reduce a number of ACK packets generated and transmitted to a particular sender. In some examples, ACK Offload Engine 432 can coalesce ACKs for multiple packet numbers into a single ACK packet regardless of whether the ACK is for a packet that included only one or more STREAM frames and no non-STREAM frames. For example, one or more ACKs from platform 450 can be coalesced with one or more ACKs generated by network controller 402. In some examples, generation of NACK for one or more STREAM frames can be offloaded to a NIC. In some examples, performance of selective ACK (RFC 2018) can be offloaded to network controller 402.

Traffic manager 434 can schedule transmissions of packets from network controller 402 to other devices. For example, traffic manager 434 can schedule transmission of an ACK packet generated by network controller 402 or platform 450 (or both) for transmission. Encrypt 436 can apply encryption specified by connection context 404 to one or more packets prior to transmission. PHY/MAC 438 can perform encoding according to applicable physical layer specifications or standards and assemble data to be transmitted in packets, that include destination and source addresses along with network control information and error detection hash values.

Figure 5:
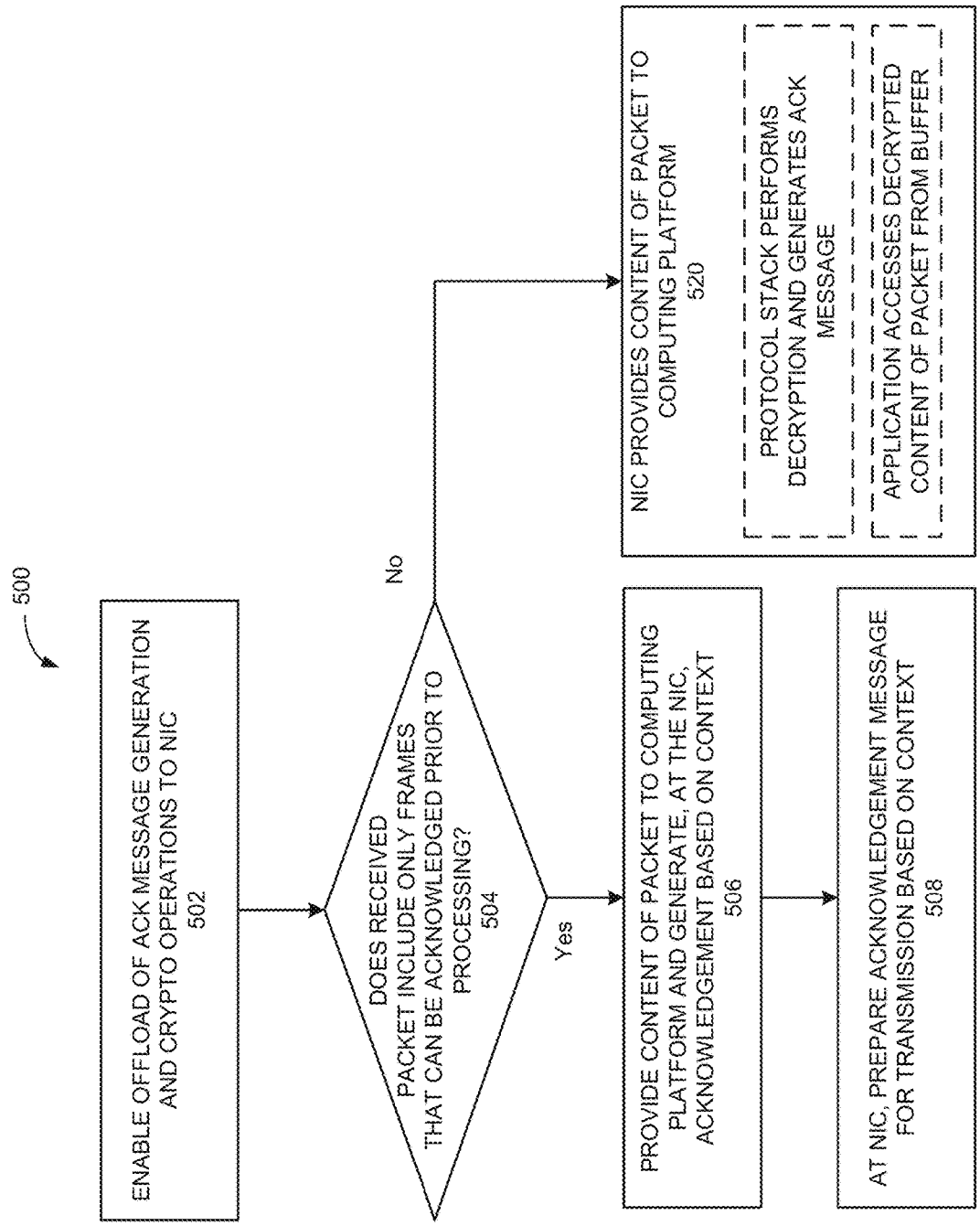
FIG. 5 depicts an example process.

FIG. 5 depicts an example process. In process 500, at 502, ACK offload and cryptographic operations, at least for packets sent over a QUIC connection, can be enabled to be performed at a NIC. In some examples, a NIC driver can enable capabilities to offload generation of ACK messages to a NIC to acknowledge receipt of frames for which acknowledgement of receipt is permitted to be made before processing of the one or more frames by an application. In some examples, a NIC driver can enable capabilities to offload generation of ACK messages to a NIC to acknowledge receipt of packets that include only STREAM frames and perform cryptography operations on the packets that include only STREAM frames.

At 504, a determination can be made as to whether receipt of the packet can be acknowledged prior to processing of the packet by an application. In some examples, the NIC can perform decryption of the packet using applicable cryptographic context for the packet. For example, a determination can be made if a decrypted version of the received packet (e.g., a packet having clear text payload) only includes STREAM frames in accordance with a QUIC specification. If the decrypted version received packet includes only frames whose receipt can be acknowledged prior to processing by an application, the process proceeds to 506. If the received packet includes any frames whose receipt cannot be acknowledged prior to processing by an application, the process proceeds to 520.

At 506, the NIC can provide content of the received packet to the computing platform for access and generate an ACK message or packet to acknowledge receipt of one or more packets. In cases where receipt of the packet was acknowledged by the NIC, the NIC can indicate that the acknowledgement was made and content of the received packet is decrypted content available for access by an application. For example, the NIC can indicate that an acknowledgement was made so that a protocol stack executed in the computing platform does not duplicate an acknowledgement of receipt. Content of the received packet can be stored in a buffer for access by an application and/or protocol stack, or other software or hardware.

For example, the NIC can form an ACK message or packet with a bit or bits in an acknowledgment field that indicate the message or packet acknowledges receipt of a packet as well as other identifiers of the received packet (e.g., packet number). In some examples, the NIC can include a packet number in the ACK message or packet to indicate which packets were received. A connection context can be used by the NIC to determine how to decrypt a received packet and track received packets by packet number. At 508, the NIC can provide the ACK message or packet for transmission to a sender or intermediary. For example, the NIC can access encryption information from the connection context to determine how to encrypt the ACK message or packet and encrypt the ACK message or packet using such encryption information. For example, the NIC can access layer 2 header fields from the connection context to determine a recipient for the ACK message or packet and insert the layer 2 header fields into the ACK message or packet. For example, the NIC can determine a transmit queue identifier from the connection context to determine a transmit queue to use to transmit the ACK message or packet and associate the ACK message or packet with the determined transmit queue. In some examples, the NIC can coalesce or bundle one or more acknowledgement messages in a packet to be sent to the same destination.

At 520, the NIC can provide content of the received packet to a buffer of a computing platform for processing by a computing platform. The protocol stack executed by the computing platform can decrypt the packet, store the decrypted packet into a buffer, and generate an acknowledgement message when or after an application has processed data from the received packet. The acknowledgement message can be provided to the NIC for transmission to a source peer device. The decrypted packet content can be accessed by an application, software stack, or other software or hardware.

Figure 6:
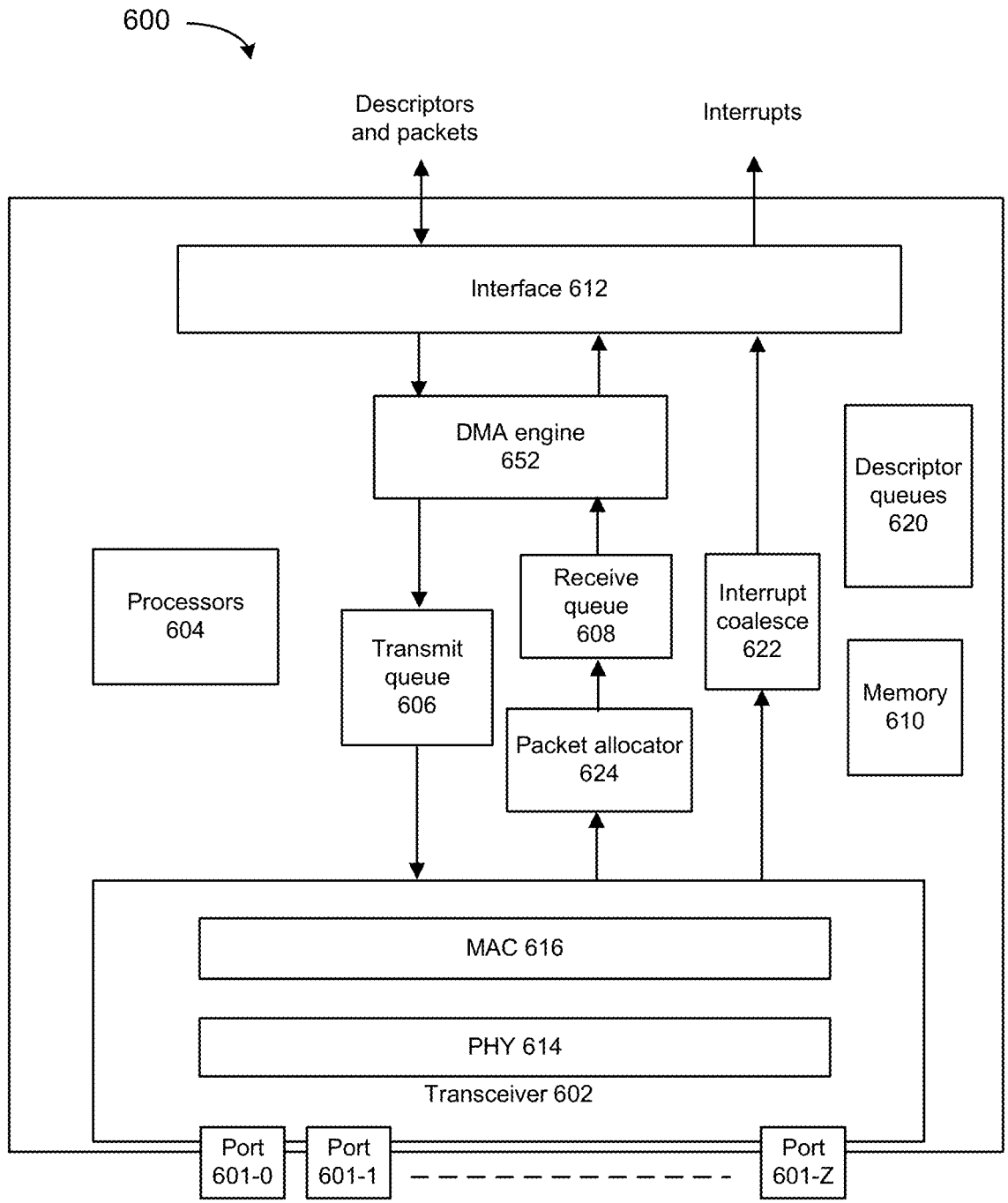
FIG. 6 depicts an example network interface.

FIG. 6 depicts an example of a network interface. Various embodiments of the network interface can at least perform embodiments described herein to provide acknowledgement of receipt of packets that include certain types of content (e.g., frames for which acknowledgement of receipt is permitted to be made before processing of the one or more frames by an application) as well as other embodiments. Transceiver 602 can be capable of receiving and transmitting packets using various ports 601-0 to 601-Z in conformance with the applicable protocols such as Ethernet as described in IEEE 802.3, although other protocols may be used. Transceiver 602 can receive and transmit packets from and to a network via a network medium (not depicted). A network medium can be a wired or wireless medium. A wired medium can conduct electrical and/or optical signals. For example, a medium can be any type of cable such as but not limited to optical fiber (e.g., 25GBASE-SX, 25GBASE-LX, 1000BASE-X, 1000BASE-SX, 1000BASE-LX, 1000BASE-BX, 1000BASE-RHx, or 1000BASE-PX), twisted pair cable (e.g., 1000BASE-T, 1000BASE-T1, 1000BASE-TX), shielded balanced copper cable (e.g., 1000BASE-CX), copper backplane (e.g., 1000BASE-KX), as well as other speeds (e.g., 10 Gbps). In some examples, a network interface can include one or more of a host fabric interface (HFI), a host bus adapter (HBA), network interface connected to a bus or connection (e.g., PCIe, CXL, DDR, and so forth).

Transceiver 602 can include PHY circuitry 614 and media access control (MAC) circuitry 616. PHY circuitry 614 can include encoding and decoding circuitry (not shown) to encode and decode data packets according to applicable physical layer specifications or standards. MAC circuitry 616 can be configured to perform MAC address filtering on received packets, process MAC headers of received packets by verifying data integrity, remove preambles and padding, and provide packet content for processing by higher layers. MAC circuitry 616 can be configured to assemble data to be transmitted into packets, that include destination and source addresses along with network control information and error detection hash values.

Processors 604 and packet processing circuitry can include any combination of a: processor, core, graphics processing unit (GPU), field programmable gate array (FPGA), application specific integrated circuit (ASIC), or other programmable hardware device that allow programming of network interface 600. For example, processors 604 can provide for identification of a resource to use to perform a workload and generation of a bitstream for execution on the selected resource. For example, a "smart network interface" can provide packet processing capabilities in the network interface using processors 604.

Packet allocator 624 can provide distribution of received packets for processing by multiple CPUs or cores using timeslot allocation described herein or RSS. When packet allocator 624 uses RSS, packet allocator 624 can calculate a hash or make another determination based on contents of a received packet to determine which CPU or core is to process a packet.

Interrupt coalesce 622 can perform interrupt moderation whereby network interface interrupt coalesce 622 waits for multiple packets to arrive, or for a time-out to expire, before generating an interrupt to host system to process received packet(s). Receive Segment Coalescing (RSC) can be performed by network interface 600 whereby portions of incoming packets are combined into segments of a packet. Network interface 600 provides this coalesced packet to an application.

Direct memory access (DMA) engine 652 can copy a packet header, packet payload, and/or descriptor directly from host memory to the network interface or vice versa, instead of copying the packet to an intermediate buffer at the host and then using another copy operation from the intermediate buffer to the destination buffer.

Memory 610 can be any type of volatile or non-volatile memory device and can store any queue or instructions used to program network interface 600. Transmit queue 606 can include data or references to data for transmission by network interface. Receive queue 608 can include data or references to data that was received by network interface from a network. Descriptor queues 620 can include descriptors that reference data or packets in transmit queue 606 or receive queue 608. Interface 612 can provide an interface with host device (not depicted). For example, interface 612 can be compatible with PCI, PCI Express, PCI-x, Serial ATA, and/or USB compatible interface (although other interconnection standards may be used).

In some examples, processors 604 can determine whether a packet includes content for which receipt can be acknowledged prior to processing by an application in accordance with embodiments described herein. In some examples, processors 604 can perform one or more of: large receive offload (LRO), large send/segmentation offload (LSO), TCP segmentation offload (TSO), Transport Layer Security (TLS) offload, receive side scaling (RSS) to allocate a queue or core to process a payload. LRO can refer to reassembling incoming network packets and transfer packet contents (e.g., payloads) into larger contents and transferring the resulting larger contents but fewer packets for access by the host system or a virtualized execution environment.

LSO can refer to generating a multipacket buffer and providing content of the buffer for transmission. A host device can build a larger TCP message (or other transport layer) (e.g., 64 KB in length) and processors 604 can segment the message into smaller data packets for transmission. TLS is defined at least in The Transport Layer Security (TLS) Protocol Version 1.3, RFC 8446 (August 2018). TLS offload can refer to offload of encryption or decryption of contents in accordance with TLS in processors 604. Network interface 600 can receive data for encryption and perform the encryption of data prior to transmission of encrypted data in one or more packets. Network interface 600 can receive packets and decrypt content of packets prior to transfer of decrypted data to a host system. In some examples, any type of encryption or decryption be performed such as but not limited to Secure Sockets Layer (SSL).

Figure 7:
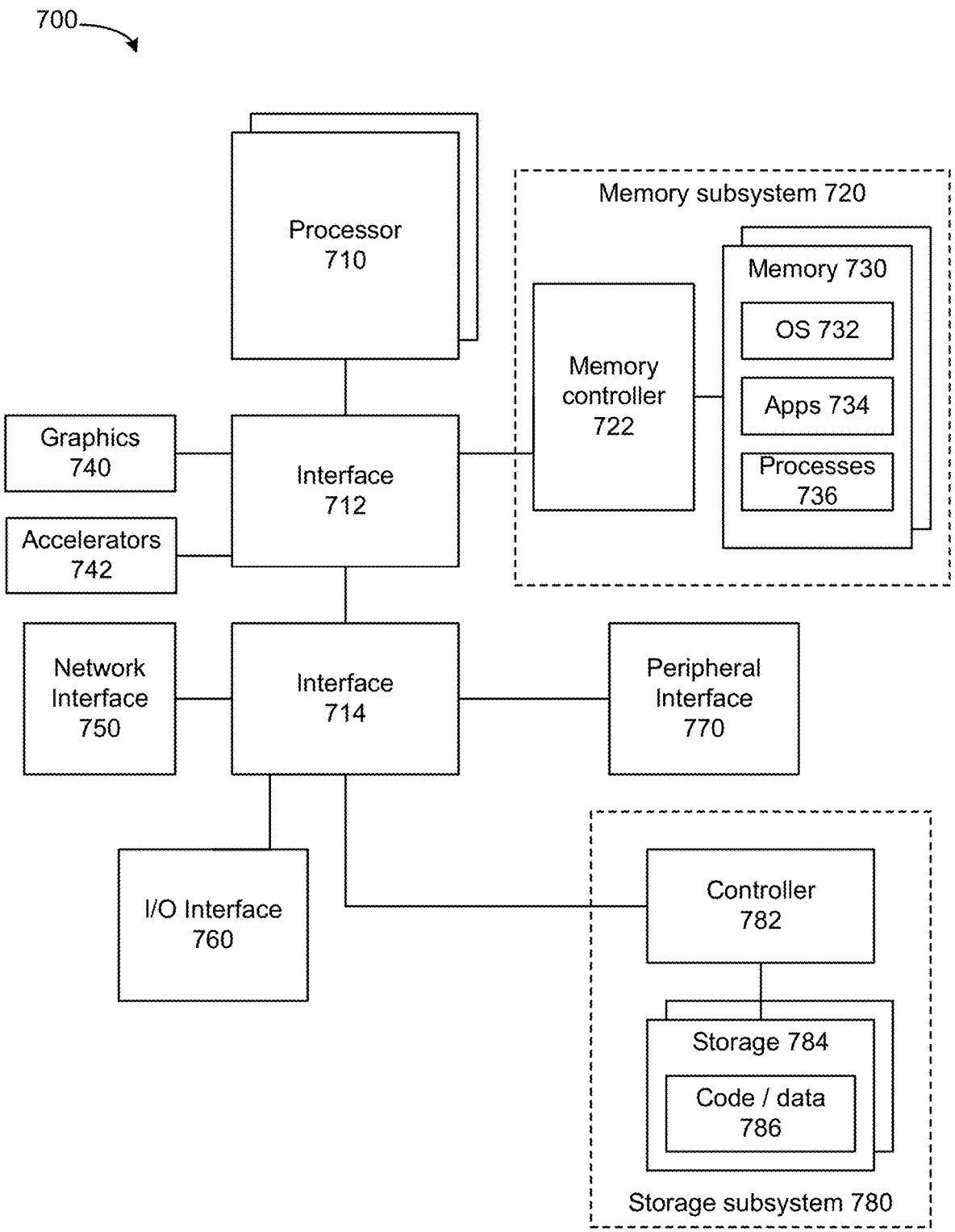
FIG. 7 depicts a system.

FIG. 7 depicts a system. Various embodiments can be used by system 700 to provide acknowledgement of receipt of packets that include certain types of content and other embodiments described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. Various embodiments of network interface 750 use embodiments described herein to receive or transmit timing related signals and provide protection against circuit damage from misconfigured port use while providing acceptable propagation delay.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 8:
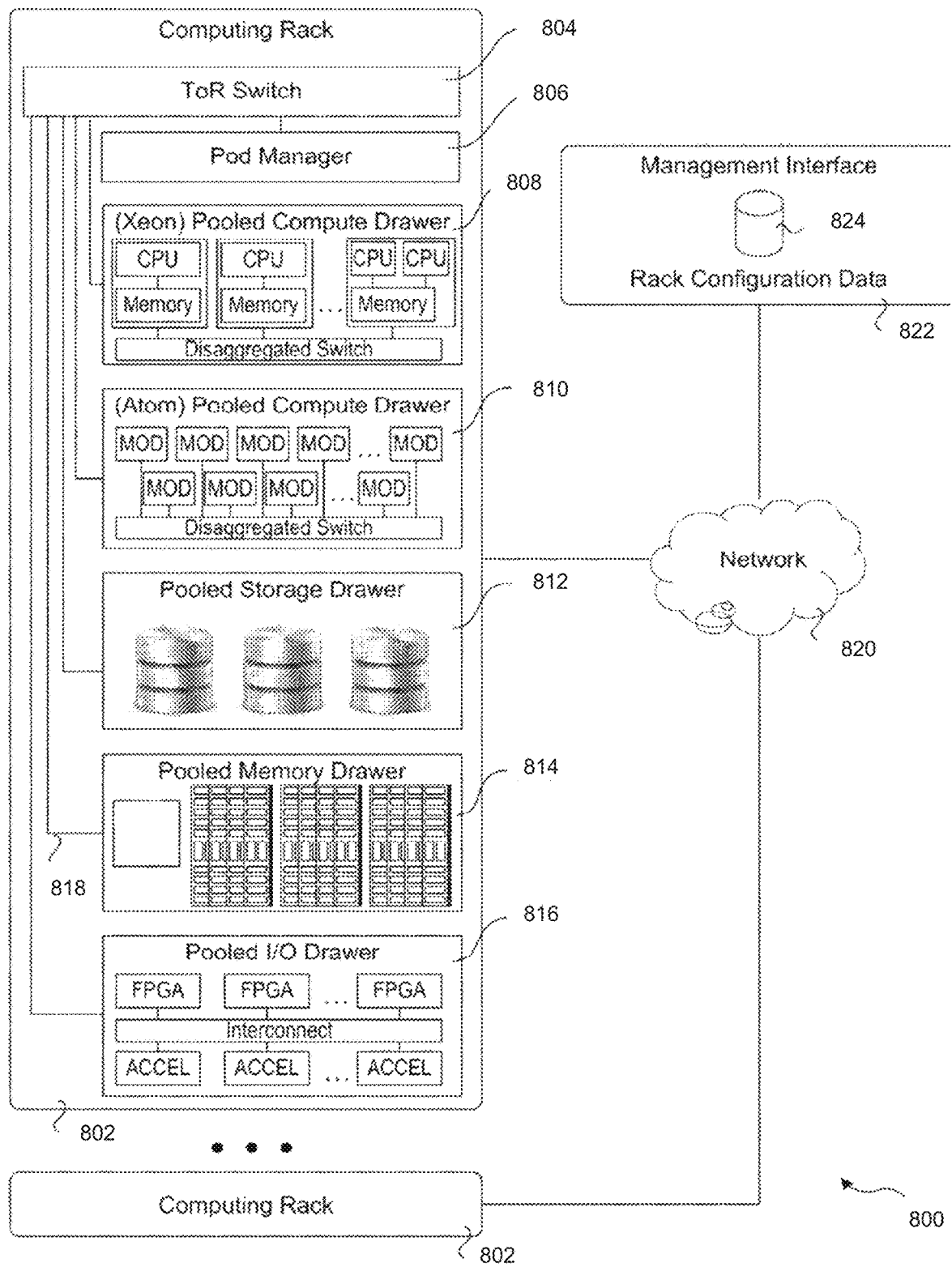
FIG. 8 depicts an example environment.

FIG. 8 depicts an environment 800 includes multiple computing racks 802, each including a Top of Rack (ToR) switch 804, a pod manager 806, and a plurality of pooled system drawers. The environment can provide acknowledgement of receipt of packets that include certain types of content in accordance with embodiments described herein as well as other embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 808, and Intel® ATOM™ processor pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824. In an example, environment 800 can be implemented using interconnected compute sleds of processors, memories, storages, network interfaces, and other components.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a method performed at a network interface, the method comprising: for a received packet: based on the received packet only including one or more frames for which acknowledgement of receipt is offloaded to the network interface, generating an acknowledgement (ACK) message to acknowledge receipt of the received packet or based on the received packet including any frame for which acknowledgement of receipt is not offloaded to the network interface, providing the received packet to a computing platform.

Example 2 includes any example, wherein a frame for which acknowledgement of receipt is offloaded to the network interface comprises a STREAM frame compatible with quick User Datagram Protocol (UDP) Internet Connections (QUIC).

Example 3 includes any example, and includes based on the received packet including any frame for which acknowledgement of receipt is not offloaded to the network interface, the computing platform generating an ACK message for the received packet.

Example 4 includes any example, wherein the generating an ACK message to acknowledge receipt of the received packet comprises generating an ACK message based at least in part on a connection context for a connection associated with the received packet and wherein the connection context comprises a crypto context and a packet number of at least one received packet.

Example 5 includes any example, and includes decrypting the received packet based on the crypto context from the connection context.

Example 6 includes any example, and includes updating the connection context based on a packet number associated with the received packet.

Example 7 includes any example, and includes based on the received packet only including one or more frames for which acknowledgement of receipt is offloaded to the network interface: decrypting the received packet; providing decrypted content of the received packet to the computing platform; and indicating that an acknowledgement has been sent for the received packet to the computing platform to avoid a duplicate acknowledgement.

Example 8 includes any example, wherein generating an ACK message to acknowledge receipt of the received packet comprises: generating header fields for the ACK message based on metadata accessible to the network interface and providing the generated ACK message with header fields for transmission to a source of the received packet.

Example 9 includes any example, and includes an apparatus comprising: a network interface card comprising: circuitry to: for a received packet: based on the received packet only including one or more frames for which acknowledgement of receipt is offloaded to the network interface card, generate an acknowledgement (ACK) message to acknowledge receipt of the received packet.

Example 10 includes any example, wherein a frame for which acknowledgement of receipt is offloaded to the network interface card comprises a STREAM frame compatible with quick User Datagram Protocol (UDP) Internet Connections (QUIC).

Example 11 includes any example, and includes a computing platform coupled to the network interface card, wherein: based on the received packet only including any frame for which acknowledgement of receipt is not offloaded to the network interface, the computing platform is to generate an ACK message for the received packet.

Example 12 includes any example, wherein the generate an ACK message to acknowledge receipt of the received packet comprises generate an ACK message based at least in part on a connection context for a connection associated with the received packet and wherein the connection context comprises a crypto context and a packet number of at least one received packet.

Example 13 includes any example, and includes circuitry to decrypt the received packet based on the crypto context.

Example 14 includes any example, and includes circuitry to update the connection context based on a packet number of the received packet.

Example 15 includes any example, and includes a computing platform coupled to the network interface card, wherein the circuitry is to: based on the received packet only including one or more frames for which acknowledgement of receipt is offloaded to the network interface card: decrypt the received packet; provide decrypted content of the received packet to the computing platform; and indicate that an acknowledgement has been sent for the received packet to the computing platform to avoid a duplicate acknowledgement.

Example 16 includes any example, wherein to generate an acknowledgement (ACK) message to acknowledge receipt of the received packet, the circuitry is to generate header fields for the ACK message based on metadata accessible to the network interface and provide the generated ACK message with header fields for transmission to a source of the received packet.

Example 17 includes any example, and includes a system comprising: a server and a network interface card communicatively coupled to the server, the network interface card comprising circuitry to: for a received packet: based on the received packet only including one or more frames for which acknowledgement of receipt is offloaded to the network interface card, generate an acknowledgement (ACK) message to acknowledge receipt of the received packet or based on the received packet including any frame for which acknowledgement of receipt is not offloaded to the network interface card, provide the received packet to the server.

Example 18 includes any example, wherein a frame for which acknowledgement of receipt is offloaded to the network interface card comprises a STREAM frame compatible with quick User Datagram Protocol (UDP) Internet Connections (QUIC).

Example 19 includes any example, wherein the network interface card comprises circuitry to: based on the received packet only including one or more frames for which acknowledgement of receipt is offloaded to the network interface card: decrypt the received packet; provide decrypted content of the received packet to the server; and indicate that an acknowledgement has been sent for the received packet to the computing platform to avoid a duplicate acknowledgement.

Example 20 includes any example, wherein the network interface card is to coalesce multiple ACK messages for transmission to a peer source device.

Example 21 includes any example, and includes a network interface card comprising: circuitry to decrypt content of a received packet; circuitry to generate an acknowledgement (ACK) message to acknowledge receipt of a received packet that includes only STREAM frames compatible with quick User Datagram Protocol (UDP) Internet Connections (QUIC); and circuitry to send the ACK message to a sender.

What is claimed is:

1. A method performed at a network interface, the method comprising:
    for a received packet:
        based on the received packet only including one or more frames for which acknowledgement of receipt is offloaded to the network interface, generating an acknowledgement (ACK) message to acknowledge receipt of the received packet and
        based on the received packet including a frame for which acknowledgement of receipt is not offloaded to the network interface, providing the received packet to a computing platform.

2. The method of claim 1, wherein a frame of the one or more frames for which acknowledgement of receipt is offloaded to the network interface comprises a STREAM frame compatible with quick User Datagram Protocol (UDP) Internet Connections (QUIC).

3. The method of claim 1, comprising:
    based on the received packet including a frame for which acknowledgement of receipt is not offloaded to the network interface, the computing platform generating an ACK message for the received packet.

4. The method of claim 1, wherein the generating the ACK message to acknowledge receipt of the received packet comprises generating the ACK message based at least in part on a connection context for a connection associated with the received packet and wherein the connection context comprises a crypto context and a packet number of at least one received packet.

5. The method of claim 4, comprising:
    decrypting the received packet based on the crypto context from the connection context.

6. The method of claim 4, comprising:
    updating the connection context based on a packet number associated with the received packet.

7. The method of claim 1, comprising:
    based on the received packet only including one or more frames for which acknowledgement of receipt is offloaded to the network interface:
    decrypting the received packet;
    providing decrypted content of the received packet to the computing platform; and
    indicating that an acknowledgement has been sent for the received packet to the computing platform to avoid a duplicate acknowledgement.

8. The method of claim 1, wherein generating an ACK message to acknowledge receipt of the received packet comprises:
    generating one or more header fields for the ACK message based on metadata accessible to the network interface and
    providing the generated ACK message with the one or more header fields for transmission to a source of the received packet.

9. An apparatus comprising:
an interface
a network interface device coupled to the interface, the network interface device comprising:
circuitry to:
for a received packet:
based on the received packet only including one or more frames for which acknowledgement of receipt is offloaded to the network interface device, generate an acknowledgement (ACK) message to acknowledge receipt of the received packet.

10. The apparatus of claim 9, wherein a frame of the one or more frames for which acknowledgement of receipt is offloaded to the network interface device comprises a STREAM frame compatible with quick User Datagram Protocol (UDP) Internet Connections (QUIC).

11. The apparatus of claim 9, comprising a computing platform coupled to the network interface device, wherein:
based on the received packet including a frame for which acknowledgement of receipt is not offloaded to the network interface device, the computing platform is to generate an ACK message for the received packet.

12. The apparatus of claim 9, wherein the generate the ACK message to acknowledge receipt of the received packet comprises generate the ACK message based at least in part on a connection context for a connection associated with the received packet and wherein the connection context comprises a crypto context and a packet number of at least one received packet.

13. The apparatus of claim 12, comprising circuitry to decrypt the received packet based on the crypto context.

14. The apparatus of claim 12, comprising circuitry to update the connection context based on a packet number of the received packet.

15. The apparatus of claim 9, comprising a computing platform coupled to the network interface device, wherein the circuitry is to:
based on the received packet only including one or more frames for which acknowledgement of receipt is offloaded to the network interface device:
decrypt the received packet;
provide decrypted content of the received packet to the computing platform; and
indicate that an acknowledgement has been sent for the received packet to the computing platform to avoid a duplicate acknowledgement.

16. The apparatus of claim 9, wherein to generate an acknowledgement (ACK) message to acknowledge receipt of the received packet, the circuitry is to
generate one or more header fields for the ACK message based on metadata accessible to the network interface device and
provide the generated ACK message with the one or more header fields for transmission to a source of the received packet.

17. A system comprising:
a server and
a network interface device communicatively coupled to the server, the network interface device comprising circuitry to:
for a received packet:
based on the received packet only including one or more frames for which acknowledgement of receipt is offloaded to the network interface device, generate an acknowledgement (ACK) message to acknowledge receipt of the received packet and
based on the received packet including a frame for which acknowledgement of receipt is not offloaded to the network interface device, provide the received packet to the server.

18. The system of claim 17, wherein a frame of the one or more frames for which acknowledgement of receipt is offloaded to the network interface device comprises a STREAM frame compatible with quick User Datagram Protocol (UDP) Internet Connections (QUIC).

19. The system of claim 17, wherein the network interface device comprises circuitry to:
based on the received packet only including one or more frames for which acknowledgement of receipt is offloaded to the network interface device:
decrypt the received packet;
provide decrypted content of the received packet to the server; and
indicate that an acknowledgement has been sent for the received packet to the server to avoid a duplicate acknowledgement.

20. The system of claim 17, wherein the network interface device is to coalesce multiple ACK messages for transmission to a peer source device.

21. A network interface device comprising:
circuitry to decrypt content of a received packet;
circuitry to generate an acknowledgement (ACK) message to acknowledge receipt of a received packet that includes only STREAM frames compatible with quick User Datagram Protocol (UDP) Internet Connections (QUIC); and
circuitry to send the ACK message to a sender.

22. The network interface device of claim 21, comprising circuitry to:
based on the received packet only including STREAM frames:
decrypt the received packet;
provide decrypted content of the received packet to a processor; and
indicate that an acknowledgement has been sent for the received packet to the processor to avoid a duplicate acknowledgement.

23. The network interface device of claim 21, comprising circuitry to coalesce multiple ACK messages for transmission to a source device.

24. The network interface device of claim 21, comprising circuitry to:
based on the received packet including a frame for which acknowledgement of receipt is not offloaded to the network interface device, a processor to generate an ACK message for the received packet.

* * * * *